Dec. 30, 1952     O. M. CLINTON     2,623,479
DOUGH CUTTING MACHINE

Filed Nov. 4, 1949     3 Sheets-Sheet 2

INVENTOR,
Otto M. Clinton
BY Henry Molz
ATTORNEY.

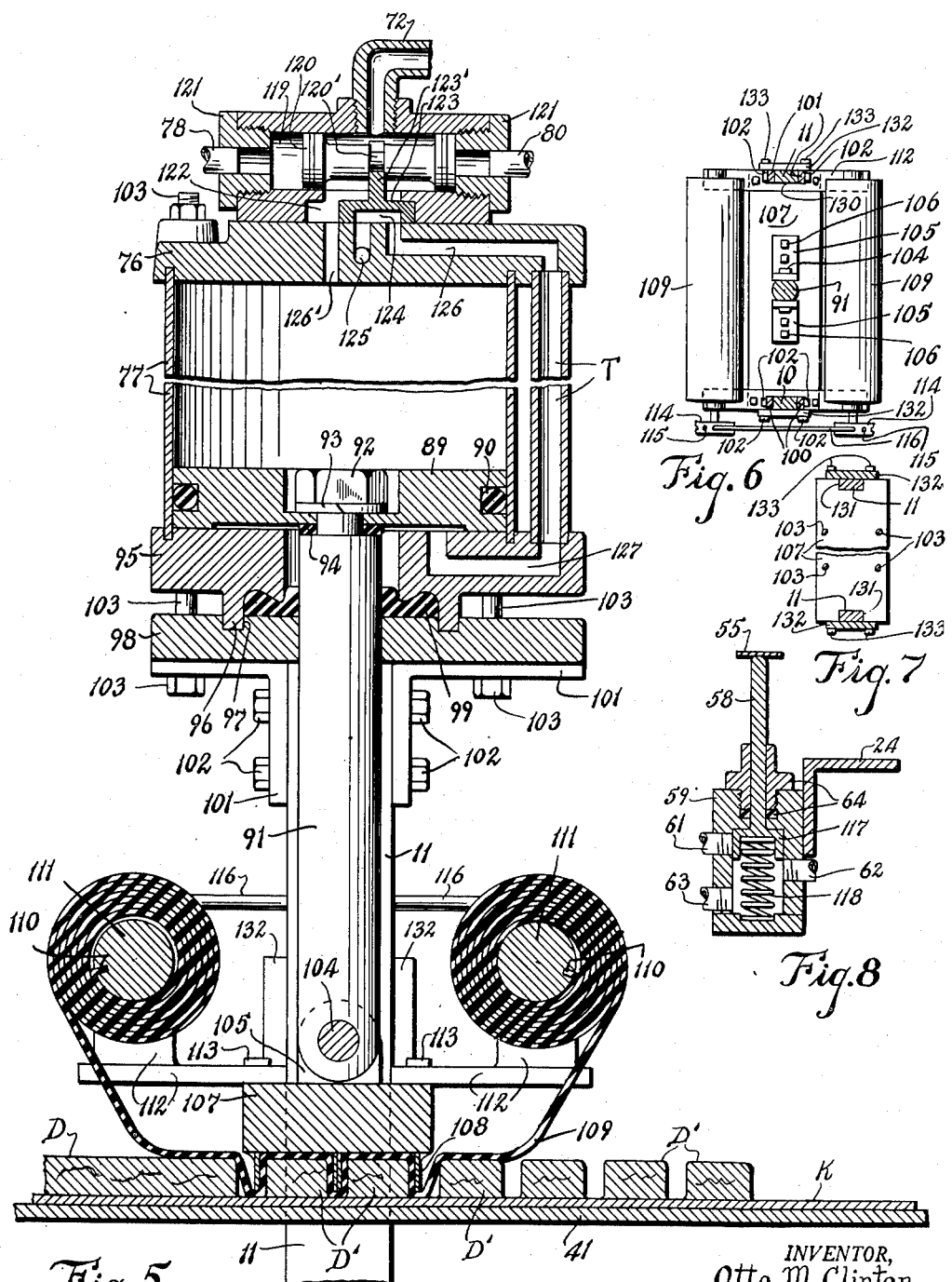

Patented Dec. 30, 1952

2,623,479

UNITED STATES PATENT OFFICE 2,623,479

DOUGH CUTTING MACHINE

Otto M. Clinton, Glendale, Calif., assignor to Maurice W. Fortney, Stewart R. Kennard, Jr., and Richard C. Samuelson, all of Glendale, Calif.

Application November 4, 1949, Serial No. 125,435

7 Claims. (Cl. 107—25)

The primary object of my invention is to provide a machine whereby a multiple number of separate units may be simultaneously cut or struck out of a slab of dough, biscuits, and cookies, for example, ready for baking.

A further object of the invention is to provide a dough cutting machine of said character which automatically in its operation, provides clearance between the struck out dough portion and the unstruck portion, and simultaneously therewith moves the latter portion for placement within the cutting range of the machine for continuous repetition in its operating process.

A further object of the invention is to provide a dough cutting machine entirely automatic in action and adjustable as to speed, and whereby a solid slab of dough may be reduced into a multiple number of separate components, each accurate as to size and weight for the production of biscuits and cookies for baking, dumplings for stewing, and doughnuts for boiling as the case may be for example.

A still further object of the invention is to provide a dough cutting machine operative to cut the slab of dough with a minimum of waste and its cutters and cutting mechanism at all times unclogged with dough so as to continuously process during its operation, a multiple number of evenly and cleanly severed dough units or pieces for futher processing as desired.

And a still further object of the invention is to provide a dough cutting machine exceptionally sanitary in its operation, and which in no manner or way affects the slab of dough other than severing the same into the component units desired.

Other objects and specific advantages of the invention over the existing art will appear from the following description and accompanying drawings, in which:

Figure 5 is an enlarged vertical section of the cutting device taken in the direction indicated by line 5—5 of Fig. 3;

Figure 6 is a plan section on line 6—6 of Fig. 1;

Figure 7 is a plan section on line 7—7 of Fig. 1, and

Figure 8 is a sectional view taken on line 8—8 of Fig. 1.

Figure 1:
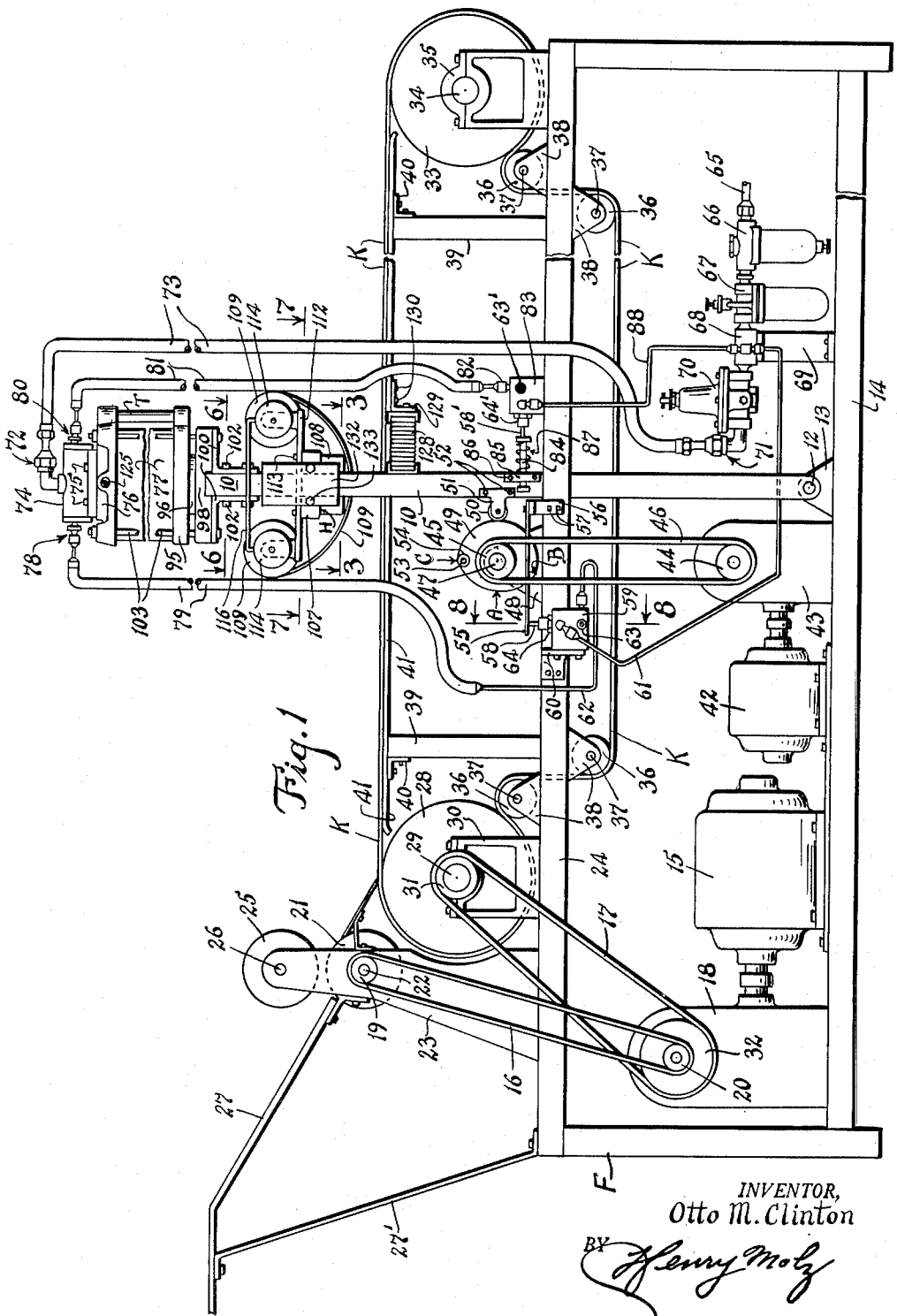
Figure 1 is a side elevation of the invention and embodying the dough stamping or cutting device in one position.

Similar letters and numerals of reference throughout the drawings indicate like parts, and wherein a cutter head H is shown mounted for vertical reciprocal movement upon a pair of posts 10 and 11, each pivoted at their lower ends by a pin 12 fixed to a bearing bracket 13 secured to lower rails 14 of the machine frame F.

The rails 14 also support a motor 15 provided to drive belts 16 and 17 through a gear reduction box 18. The belt 16 is carried on pulleys 19 and 20 and turns a dough roller 21 mounted upon a shaft 22 journaled at each end in a bearing supported by member 23 secured to the top of an upper rail 24 of the frame F.

A second dough roller 25 mounted upon a shaft 26 and also journaled in bearings supported by member 23 is properly spaced for correct dough thickness above the roller 21 and is turned by friction as dough is rolled between said dough rollers 21 and 25 respectively.

An inclined table 27 attached to the bearings in the support member 23 and supported above the frame F by a brace 27' serves to guide the dough into the rollers 21 and 25.

A conveyer belt K is driven at one end by a pulley 28 mounted upon a shaft 29 journaled at both ends in a bearing supported by member 30 secured to the top of the rails 24. The pulley 28 is driven by the belt 17 carried upon pulleys 31 and 32.

An idler pulley 33 of the same diameter as pulley 28 is mounted upon a shaft 34 journaled at each end in a bearing supported by member 35 secured to the top of the rail 24. Somewhat smaller idler pulleys 36—36 turn on pins 37—37 carried by bearing brackets 38—38 attached to the rail 24. The pulleys 28 and 33 are respectively positioned adjacent opposite ends of the rails 24 and the conveyer belt K is supported by the pulleys 28, 33 and 36, and is driven by the pulley 28.

Upright frame members 39—39 and cross angles 40—40 support a table 41 underlying that portion of the belt K disposed between the pulleys 28 and 33.

Power from a motor 42 supported by the rails 14 is transmitted through a gear reduction box 43, pulleys 44 and 45, and a belt 46 to a shaft 47 journaled in a bearing bracket 48 secured upon the rail 24.

A cam 49 mounted upon the shaft 47 is in continuous engagement with a roller 50 carried by a bearing 51 secured by bolts 52 to the post 10.

A pin 53 fixed in one side of the cam 49 supports a roller 54 positioned to intermittently engage a flat spring 55 having one end fixed to an angle bracket 56 secured to the rails 24 by rivets 57; the other end of said spring overlies and engages the end of an upright valve stem 58 of a valve 59 secured to the rails 24 by an angle bracket 60.

The valve 59 is provided with an air inlet line 61, an air outlet line 62, and an exhaust pipe 63.

A packing gland 64 is provided in the valve 59 about the stem 58.

Compressed air is supplied to the inlet line 61 from a source pipe 65 through an air cleaner 66, an oiler 67 and a fitting 68 all supported upon the rails 14 by a bracket 69.

An air regulator 70 is also connected to the fitting 68 whereby compressed air is supplied through hose connections 71 and 72 and a hose 73 to a piston valve 74. The latter is attached by bolts 75 to the upper head 76 of a cylinder 77. One side of the valve 74 is connected by a fitting 78 and a hose 79 to the air outlet line 62. The other side thereof is connected by a fitting 80 and a hose 81 to an air outlet line 82 of a valve 83 attached to the rails 24. The valve 83 is like the valve 59. It has a valve stem 58' and a packing gland 64' wherein the valve stem is slidably mounted. A pin 84 is slidably mounted in a bracket 85 secured to post 10 and urged forwardly by compression spring 87 to engage and displace the valve stem 58' inwardly as post 10 moves forwardly to its vertical position shown in Fig. 1.

The valve 83 is also connected by an air inlet line 88 to the fitting 68 and has an exhaust pipe 63.'

The cylinder 77 contains a piston 89 having a ring 90. One end of a piston rod 91 is connected to said piston 89 by a nut 92, a lock-washer 93 and a sealing-washer 94.

A lower head 95 is provided for the cylinder 77 having a depending annular flange 96 engaging an annular groove 97 in the top of a cross bar 98 provided to support the cylinder 77. A gasket 99 is disposed about the piston rod 91 between the head 95 and the bar 98. The latter is supported at its ends by angle plates 100 and 101 attached respectively to upper ends of the posts 10 and 11, by bolts 102.

Long bolts 103 secure the cylinder 77 and its heads 76 and 95 to the cross bar 98.

The lower end of the piston rod 91 is attached by a pin 104, angle plates 105 and bolts 106 to the top of a cutter head or bar 107.

Figure 3:
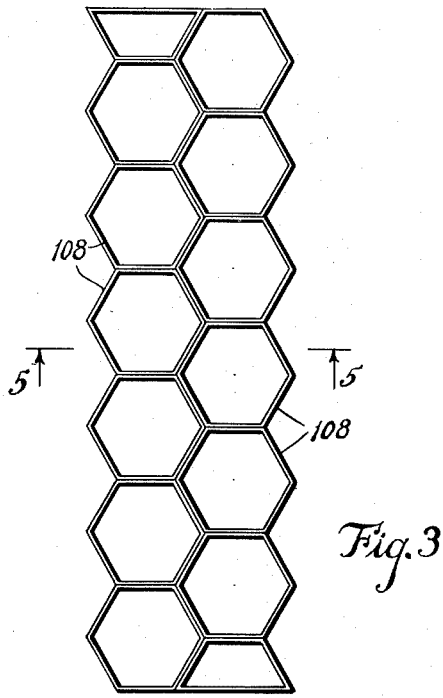
Figure 3 is a plan section of the cutting knives taken on line 3—3 of Fig. 1.
Figure 4:
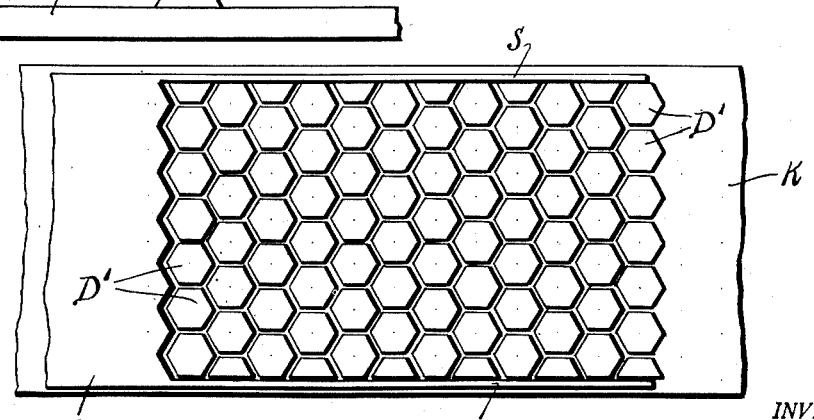
Figure 4 is a plan view of a fragmentary length of the conveyer belt with a plurality of cut out dough portions and separated from the slab of dough.

Hexagonal cutting or forming knives 108 are attached as by welding to the underside of the bar 107 in an interlocking double row as shown in Figure 3.

A thin flexible sheet of rubber 109 depends beneath the knives 108 with its ends 110 fixed to a pair of rollers 111 having their ends mounted in bearings 112 attached by bolts 113 to the top of and adjacent the ends of the bar 107.

The rollers 111 are each provided with a knob 114 at one end having spaced holes 115 provided on their periphery to receive the ends of a locking rod 116.

A piston 117 of the valves 59 and 83 is normally urged to the exhaust position as seen in Figure 7, by a spring 118.

The valve 74 is provided with a bore 119 containing a dual headed piston 120. The bore 119 is closed at its end by threaded plugs 121 which are internally threaded to receive the fittings 78 and 80.

The base of the valve 74 is machined out to form a cavity 122. A sliding gate valve 123 is positioned to reciprocate in said cavity 122. The valve 123 is provided with an upstanding yoke 123', and is cut out on its bottom side to provide an air passage 124 communicating at all times with an exhaust port 125 provided in the head 76.

The piston 120 is reduced in diameter at 120' to provide shoulders for engaging the yoke 123'.

In Figure 5 the passage 124 also communicates with an air passage 126 formed in the head 76. A tube T connects said passage 126 with an air passage 127 formed in the lower head 95.

A spring 128 disposed between an angle 129 secured to the table 41 by bolts 130 and the post 10 urges the latter toward the cam 49.

The bases of the bearings 112 are notched at 130 for the posts 10 and 11 and the ends of the bar 107 are notched at 131, and plates 132 are attached to the ends of the bar 107 by bolts 133 to provide guideways for the posts 10 and 11.

In operating the machine, a slab of dough D of approximately correct thickness is manually fed from the table 27 into the space between the rollers 21 and 25 which roll the slab into the correct thickness and feed it down an inclined shelf 134 onto the conveyor belt K. The movement of the latter and the cam 49 are synchronized so that a continuous flow of cut dough portions D' are moved by the belt K towards the roller 33.

The belt K moves toward the right and the cam 49 turns clockwise in Fig. 1.

The cutter head H is shown in Fig. 1 as being held at the top of its upward stroke by the pressure of air beneath the piston 89. This is so because the pressure of the spring 87 is forcing the pin 84 against the valve stem 58' and thereby opening the valve 83 to establish communication between line 88 and line 81. The actuation of the valve 83 will be understood by reference to Fig. 8, which illustrates valve 59 which is of a construction similar to 83. The valve in Fig. 8 is at the other end of its travel to that described above for valve 83. In the above description the pin 84 has pushed the valve inwardly so that the valve covers the exhaust port 63' and establishes communication between the air inlet line 88 and the air hose 81.

When air from the fitting 80 moves the piston 120 to the left (Fig. 5), the valve 123 will also move to the left to permit air in cylinder 77 to be exhausted through the port 123', the passage 124 and the exhaust port 125. At the same time communication is established between fitting 72 and passage 126, since the valve 123 in moving to the left uncovers 126 when it spans 126'. Air will be admitted from the fitting 72 into the passage 126, tube T, to the underside of the piston 89 and thereby raise the latter together with the cutter head H. The latter is held in said upward position as long as the roller 50 engages the cam 49 between the points B and C of cam 49. Meanwhile the uncut dough slab D is moving toward the right.

When the point C reaches the roller 50, the latter will start to move rapidly toward the axis of the cam 49 under the impulse of the spring 128.

Figure 2:
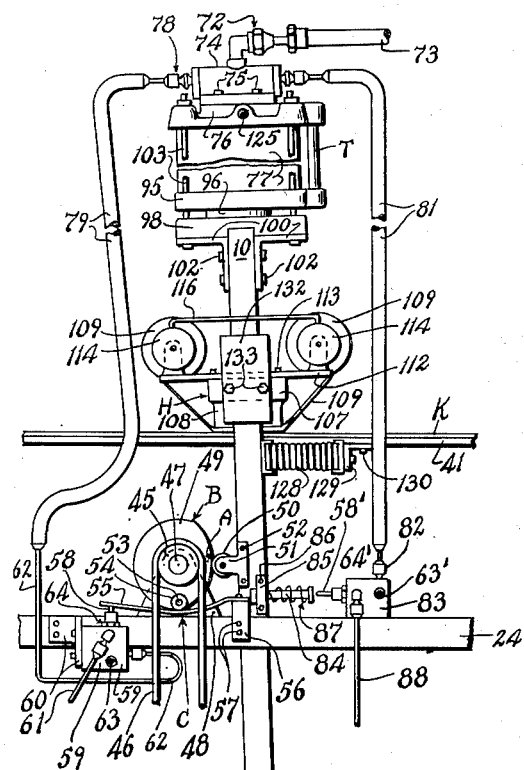
Figure 2 is a fragmentary elevation of the machine similar to Figure 1, but showing the cutter in its cutting position.

As the lowest part of the cam marked A moves toward the roller 50, the roller 54 will begin to depress the spring 55 into the position shown in Fig. 2, thereby opening the valve 59 so that air from the line 61 will pass through the valve 59, the line 62, the hose 79, and the fitting 78 to move the piston 120 to the right (see Fig. 5).

The valve 123 will also move to the right permitting air from underneath the cylinder to exhaust through tube T, passageway 126, cavity 124, and the exhaust port 125. When the valve 123 has spanned the exhaust port 125 and passageway 126, communication is established between 72 and port 126' to permit air from the fitting 72 to enter the cylinder 77 thereby forcing the piston 89 and the cutter head H downward into cutting position.

As the diameter of the cam 49 increases rapidly from the point A to the point C, the posts 10 and 11 are caused to move quickly to the right, and this, even while the dought slab is being cut because the roller 54 will continue to depress the spring 55. This movement of the posts 10 and 11 to the right is slightly faster than the movement of the belt K to the right. This causes the newly cut dough portion D' to be slid rapidly along the belt K and away from the uncut slab of dough D for about one-eight (⅛) of an inch just prior to the moment when the point B of the cam 49 causes the valve 83 to be opened and the cutter head H to be raised.

The rapid sliding movement of the cutter head H prevents any buckling of the slab of dough D behind said cutter head.

When the piston 89 is forced downward as in Fig. 5, air will be exhausted from beneath said piston 89 through the passage 127, the tube T, the passage 126, the passage 124 and the exhaust port 125.

As will be observed from Fig. 1, at the top of the stroke of piston 89, the rubber sheet hangs loosely in a loop without tension from the rollers 111, the degree of sag being adjusted by the knobs 114. As the cutter head 107 descends, the rubber sheet is first laid on top of the slab of dough 17 so as to be flat on the dough over the portion into which the knives will penetrate and also over the adjacent portions of the dough on both sides of said dough portion. As the blades penetrate into the dough, the dough is forced into the die cavity between the blades 108 and the rubber folds about the knives 108 and is stretched by the dough inside the cavity. The dough conforms to the die cavity. However, the belt section, outside the die in the line of the travel of the dough, is not stretched and loosely contacts the adjacent dough, both cut and uncut on both sides of the cutter head, as shown in Fig. 5. As the cutter head is retracted by the upward movement of piston 89, the tension in the rubber inside the die cavity between the cutter blades is released and the rubber diaphragm acts as a stripper or parting membrane to prevent sticking of the cut dough portions D' to said knives.

Figure 5 shows the completion of the cut with the post 11 in the vertical position and at the point where the head H is immediately lifted by air pressure under the piston 89 and another cycle of operation thereupon begins.

When the rubber sheet 109 becomes worn under the knives 108, the rod 116 is removed and the rollers 111 are turned by the knobs 114 to present a new rubber surface beneath the knives.

Waste or trimmings of dough is reduced to a mere string S on each side of the belt K. Adjacent the string of dough, in alternate rows of the hexagons of dough D', are positioned half hexagon dough sections.

One of the characteristics of the machine is that it practically leaves no trim or so-called waste in its cutting operations, as aforesaid, and thereby substantially eliminates the reforming into slab form of a large quantity of dough trimmings, more or less common to all other dough cutting machines. That this is highly advantageous is indisputable, since it is a known fact that re-run dough trimmings and especially such as is prepared with shortening, is affected to a definite extent in the re-rolling process results in a lowered quality eatable product.

Machines in common use for a like purpose incorporate roller dies. These machines in their operation create an extensive amount of dough trim, in some instances as high as sixty per cent (60%) of the total rolled batch. This percentage of dough in its re-roll for further use no longer possesses the identical texture it originally possessed, and thus results in a materially lowered quality product.

In use, my invention creates but an insignificant quantity of dough trim, less than one per cent (1%) of the total batch. It is confined almost wholly to a narrow ribbon of dough on the outer edges of the slab.

The uniquely designed cutters and their coacting cutting operation produce twelve (12) individually cut units with each cutting stroke, and regardless of the consistency of the dough, all such units being cleanly cut or severed from one another and from the dough slab. This results from the construction of the hexagonal cutter formed of a honeycomb configuration of nested adjacent hexagonal die cavities formed by nested hexagonal cutting die blades, as shown in Figs. 3 and 5. Moreover, neither the cutters nor the conveying belt can become dough clogged or besmirched. This is of extreme importance in production and a material advance in the art in that it eliminates both lost time resulting from constant delays in cleaning the cutters, and uneven ragged edged products, inherent to clogged cutters and dough besmirched belt conveyer means. Both are more or less commonly experienced with the dough cutting machines in common use.

The machine may readily be manufactured equipped with cutters of varying sizes and from materials readily obtainable in the open market.

As numerous apparently different embodiments and changes in structure may from time to time suggest themselves without departing, however, from the scope thereof as herein shown and described, it is intended that the description and drawings submitted shall be interpreted as illustrative and not in a limiting sense. Hence, I do not limit my invention to the herein disclosure, but what I do claim is:

1. In a dough cutting machine, a frame, an endless belt operating on the frame for moving a slab of dough in one direction, an upright support pivoted on the frame for movement in the direction of the length of the belt and being extended above the belt, a cutter head mounted on said support above the belt for movement toward and away from the belt, cutting blades on said head for cutting a transverse portion of the slab into a plurality of rows of separate pieces, a flexible apron carried by said head beneath said blades and arranged to be forced by the blades through the slab of dough on the cutting stroke of said head, means for continuously moving the belt to move the slab of dough beneath the cutter head, means operating to move the cutter head into and out of a position for cutting portions of the slab of dough into pieces, and means operating when the dough pieces become severed from the slab for moving the support and cutter head thereon in the direction of travel of said belt at a greater rate than the rate of movement of the belt whereby the cut pieces are moved relative to the belt away from the uncut portion of the slab before the head is moved out of its cutting position.

2. In a dough cutting machine, a frame, an endless belt operating on the frame for moving a slab of dough in one direction, an upright support pivoted on the frame for movement in the direction of the length of the belt and being extended above the belt, a cutter head mounted on said support above the belt for movement toward and away from the belt, cutting blades on said head for cutting a transverse portion of the slab into a plurality of rows of separate pieces, means for continuously moving the belt to move the slab of dough beneath the cutter head, means operating to move the cutter head into and out of a position for cutting portions of the slab into pieces, and means operating when the dough pieces become severed from the slab for moving the support and cutter head thereon in the direction of travel of said belt at a greater rate than the rate of movement of the belt whereby the cut pieces are moved relative to the belt away from the uncut portion of the slab before the head is moved out of its cutting position.

3. In a dough cutting machine, a frame, an endless belt operating on the frame for moving a slab of dough in one direction, an upright support pivoted on the frame for movement in the direction of the length of the belt and being extended above the belt, a cutter head mounted on said support above the belt for movement toward and away from the belt, cutting blades on said head for cutting a transverse portion of the slab into a plurality of rows of separate pieces, means for continuously moving the belt to move the slab of dough beneath the cutter head, means operating to move the cutter head into said dough for cutting portions of the slab into pieces, means operating when the dough pieces become severed from the slab for moving the support and cutter head thereon in the direction of travel of said belt at a greater rate than the rate of movement of the belt whereby the cut pieces are moved relative to the belt away from the uncut portion of the slab before the head is moved out of its cutting position, means for retracting said cutting head, and means for thereafter moving said support and cutter head in a direction opposite to said direction of travel of said belt to move said cutting head into dough cutting position.

4. In a dough cutting machine a cutting head, means for moving said cutting head into and out of cutting position, a support for an elongated slab of dough arranged beneath said head, means for advancing said support to move said dough under said cutting head, a plurality of cutting blades arranged in a row on said head to cut a portion of the slab extending thereacross into a plurality of pieces, and a flexible apron carried by said head depending loosely in a loop beneath the blades, the length of said loop being sufficient so that it will fold around the blades when the latter are forced through said slab of dough to cut the same into pieces and lay loosely on the dough outside said cutting head and adjacent said cutting knives in the line of advance of said dough.

5. In a dough cutting machine a cutting head, means for moving said cutting head into and out of cutting position, a support for an elongated slab of dough arranged beneath said head, means for advancing said support to move said dough under said cutting head, a plurality of cutting blades arranged in a row on said head to cut a portion of the slab extending thereacross into a plurality of pieces, a flexible apron carried by said head and depending beneath the blades so that it will fold around the blades when the latter are forced through said slab of dough to cut the same into pieces, rollers on said head on each side of said cutter, said apron being wound on both rollers, and means for independently rotating each roller, whereby the apron may be wound from one roller onto the other roller and the degree of slackness of said flexible sheet adjusted.

6. In a dough cutting machine a cutting head, means for moving said cutting head into and out of cutting position, a support for an elongated slab of dough arranged beneath said head, means for advancing said support to advance said dough under said cutting head, a plurality of adjacent and nested hexagonal cutting die cavities formed by hexagonal cutting blades arranged in a honeycomb row on said head to cut a portion of the slab extending thereacross into a plurality of pieces, a flexible apron carried by said head depending loosely in a loop beneath the blades, the length of the loop being sufficient so that it will fold around the blades when the latter are forced through said slab of dough to cut the same into pieces, and lay loosely on the dough outside said cutting head and adjacent said cutting knives in the line of advance of said dough.

7. A dough cutting machine comprising means for advancing a slab of dough, a cutting head reciprocally mounted in dough cutting position over said dough advancing means, said cutter comprising a plurality of adjacent hexagonal cavities, hexagonal dough cutting blades separating said cavities and nested in a honeycomb structure, a pair of rollers mounted for reciprocation with said cutting head, means for independently rotating said rollers, a flexible apron wound on said rollers, whereby it may be rolled from one roller to the other and hang in a loop of desired slackness beneath said cutting head by rotating each of said rollers.

OTTO M. CLINTON.

REFERENCES CITED

The following references are of record in the file of this patent:

UNITED STATES PATENTS

| Number | Name | Date |
| --- | --- | --- |
| 1,831,826 | Sergent | Nov. 17, 1931 |
| 2,288,908 | Kretchman | July 7, 1942 |
| 2,294,020 | Breth et al. | Aug. 25, 1942 |

FOREIGN PATENTS

| Number | Country | Date |
| --- | --- | --- |
| 283 | Great Britain | Nov. 9, 1889 |